(12) United States Patent
Jacobi

(10) Patent No.: US 11,549,716 B2
(45) Date of Patent: Jan. 10, 2023

(54) WASTEWATER CONDITIONING APPARATUS AND METHOD

(71) Applicant: Robert W. Jacobi, Indianapolis, IN (US)

(72) Inventor: Robert W. Jacobi, Indianapolis, IN (US)

(*) Notice: Subject to any disclaimer, the term of this patent is extended or adjusted under 35 U.S.C. 154(b) by 0 days.

(21) Appl. No.: 17/656,501

(22) Filed: Mar. 25, 2022

(65) Prior Publication Data
US 2022/0212967 A1    Jul. 7, 2022

Related U.S. Application Data

(63) Continuation of application No. PCT/US2021/032049, filed on May 12, 2021.
(Continued)

(51) Int. Cl.
*C02F 3/00* (2006.01)
*C02F 3/02* (2006.01)
(Continued)

(52) U.S. Cl.
CPC .............. *F24F 11/84* (2018.01); *C02F 3/006* (2013.01); *C02F 3/02* (2013.01); *F24F 5/0003* (2013.01);
(Continued)

(58) Field of Classification Search
CPC ........ F28D 7/0091; F28D 7/16; F28D 7/1607; F24D 2200/20; F24F 5/0046; F24F 2005/0064; C02F 3/006; C02F 3/02
(Continued)

(56) References Cited

U.S. PATENT DOCUMENTS 3,760,868 A    9/1973   Cywin
4,375,831 A    3/1983   Downing, Jr.
(Continued)

FOREIGN PATENT DOCUMENTS

JP    2002-310524        10/2002
JP    2002-310524 A      10/2002
(Continued)

OTHER PUBLICATIONS

English Machine Translation of JP 2002-310524 A obtained from WIPO Feb. 7, 2019.
(Continued)

*Primary Examiner* — Claire A Norris
(74) *Attorney, Agent, or Firm* — Woodard, Emhardt, Henry, Reeves & Wagner, LLP

(57) ABSTRACT

A method of conditioning wastewater includes flowing wastewater into and through a first fluid tube and flowing a heat transfer fluid into and through a second fluid tube. The heat transfer fluid entering the second fluid tube has a different temperature than the wastewater entering the first fluid tube. The first fluid tube and said second fluid tube are positioned within a first casing that is surrounded by insulation. The first casing and the insulation are positioned within a second casing. The wastewater in said first fluid tube and said heat transfer fluid in said second fluid tube are arranged to allow heat transfer between the wastewater in said first fluid tube and the heat transfer fluid in said second fluid tube.

15 Claims, 15 Drawing Sheets

Related U.S. Application Data

(60) Provisional application No. 63/023,266, filed on May 12, 2020.

(51) Int. Cl.
    *F24F 11/84* (2018.01)
    *F24F 5/00* (2006.01)
    *F28D 7/16* (2006.01)

(52) U.S. Cl.
    CPC .............. *F24F 5/0046* (2013.01); *F28D 7/16* (2013.01); *C02F 2209/02* (2013.01); *C02F 2303/10* (2013.01); *F24F 2005/0057* (2013.01); *F28F 2270/00* (2013.01)

(58) Field of Classification Search
    USPC .......................................... 165/177; 210/151
    See application file for complete search history.

(56) References Cited

U.S. PATENT DOCUMENTS

| | | |
|---|---|---|
| 4,466,256 A | 8/1984 | MacCracken |
| 5,816,510 A | 10/1998 | Earle, III et al. |
| 6,412,550 B1 | 7/2002 | McLaughlin |
| 6,688,129 B2 | 2/2004 | Ace |
| 8,815,093 B2 | 8/2014 | Mahony |
| 9,038,408 B2 | 5/2015 | Sabo |
| 10,443,909 B2 | 10/2019 | Wiggs |
| 2005/0194120 A1* | 9/2005 | Lomax ................... F28F 19/06 165/100 |
| 2006/0242983 A1 | 11/2006 | Spadafora et al. |
| 2007/0209380 A1 | 9/2007 | Mueller et al. |
| 2007/0221362 A1 | 9/2007 | Stewart et al. |
| 2010/0139886 A1 | 6/2010 | Desmeules |
| 2010/0236750 A1 | 9/2010 | Naneff et al. |
| 2012/0255706 A1 | 10/2012 | Fadayon et al. |
| 2012/0261091 A1 | 10/2012 | Krecke |
| 2013/0037236 A1 | 2/2013 | Saunier et al. |
| 2013/0056191 A1 | 3/2013 | Duong |
| 2013/0228309 A1 | 9/2013 | Wood et al. |
| 2014/0048244 A1 | 2/2014 | Wallace |
| 2014/0284275 A1 | 9/2014 | Boccato et al. |
| 2015/0013370 A1 | 1/2015 | Wiggs |
| 2018/0328633 A1* | 11/2018 | Jacobi ................... F25B 25/005 |

FOREIGN PATENT DOCUMENTS

| | | |
|---|---|---|
| WO | 2014/130545 A1 | 8/2014 |
| WO | WO 2014/130545 A1 | 8/2014 |
| WO | 2015/066764 A1 | 5/2015 |
| WO | WO 2015/066764 A1 | 5/2015 |
| WO | 2015/136156 A1 | 9/2015 |
| WO | WO 2015/136156 A1 | 9/2015 |

OTHER PUBLICATIONS

International Search Report and Written Opinion issued in PCT/US2021/032049, dated Oct. 1, 2021, 18 pgs.

International Search Report and Written Opinion corresponding to International Patent Application No. PCT/US2021/032049, dated Oct. 1, 2021 (12 pages).

* cited by examiner

WASTEWATER CONDITIONING APPARATUS AND METHOD

CROSS REFERENCE TO RELATED APPLICATIONS

This application is a continuation of International Patent Application No. PCT/US2021/032049 filed May 12, 2021, which claims the benefit of the filing date of Provisional U.S. Patent Application No. 63/023,266, filed on May 12, 2020, which is hereby incorporated by reference in its entirety.

BACKGROUND

Naturally occurring organisms in sewage that digests and treats wastewater are most effective at certain temperature ranges. In the winter, wastewater may be too cold for the organisms to effectively treat the wastewater. In the summer, the wastewater may become too hot for the organisms to effectively treat the wastewater. Therefore, a system for heating the wastewater in the winter and for cooling the wastewater in the summer would be beneficial to increase treatment efficiency.

SUMMARY

A method comprises flowing wastewater into and through a first fluid tube and flowing a heat transfer fluid into and through a second fluid tube. The heat transfer fluid entering the second fluid tube has a different temperature than the wastewater entering the first fluid tube. The first fluid tube and the second fluid tube are positioned within a first casing and the first casing is surrounded by insulation having an RSI of at least 0.8 $m^2 \cdot K/W$. The first casing and the insulation are positioned within a second casing. In some examples, the insulation is a closed cell type insulation. The wastewater in the first fluid tube and the heat transfer fluid in the second fluid tube are separated by material having an RSI of less than 0.6 $m^2 \cdot K/W$ to allow heat transfer between the wastewater in the first fluid tube and the heat transfer fluid in the second fluid tube.

In some embodiments, the first fluid tube is adjacent to the second fluid tube within the first casing so that the wastewater and the heat transfer fluid are separated by walls of the first fluid tube and the second fluid tube.

In some embodiments, a third fluid tube is positioned within the first casing and the wastewater in the first fluid tube and a fluid within the third fluid tube are separated by material having an RSI value ($m^2 \cdot K/W$) of less than 0.6 to allow heat transfer between the wastewater and the fluid within the third fluid tube.

In some embodiments, a heat transfer enhancement grout is positioned within the first casing and around at least a portion of the second fluid tube.

In some embodiments, the wastewater within the first fluid tube flows in an opposite direction of the heat transfer fluid within the second fluid tube.

In some embodiments, the wastewater is at least one of sewage, surface storm water, lake water, river water, or brackish water.

In some embodiments, heat transfer fluid entering the second fluid tube is at a higher temperature than the wastewater entering the first fluid tube. Heat from the heat transfer fluid in the second fluid tube is transferred to the wastewater to heat the wastewater to a degree sufficient to activate microbes in the wastewater and increase treatment capacity.

In some embodiments, heat transfer fluid entering the second fluid tube is at a lower temperature than the wastewater entering the first fluid tube. Heat from the wastewater is transferred to the heat transfer fluid to a degree sufficient to reduce microbes in the wastewater from becoming anaerobic. In some instances, the heat transfer fluid communicates with a heating, ventilation, and air conditioning (HVAC) system of a building.

In another embodiment of the present invention, a heat exchange system comprises a heat exchanger having a length. The heat exchanger includes a first fluid tube having a flow of wastewater into and through the first fluid tube and a second fluid tube having a flow of heat transfer fluid into and through the second fluid tube. The heat transfer fluid entering the second fluid tube has a different temperature than the wastewater entering the first fluid tube. The first fluid tube and the second fluid tube are positioned within a first casing and an insulation surrounds the first casing. The first casing and the insulation are positioned within an outer casing having a width and a height. A framework is configured to support the heat exchanger and the framework includes a first box channel base including a first end and a second end. A pair of box channel supports extend vertically from each end of the first box channel base. Each pair of box channel supports includes a first support and a second support. A distance between the first support and the second support is greater than the width of the outer casing of the heat exchanger. A height of the box channel supports is at least double the height of the outer casing. The length of the heat exchanger is arranged in a coil and each pair of box channel supports holds at least two non-continuous portions of the length of the heat exchanger.

In some embodiments, the system includes a third fluid tube including a length and a flow of second heat transfer fluid into and through the third fluid tube, wherein the second heat transfer fluid entering the third fluid tube has a different temperature than the wastewater entering the first fluid tube.

In some embodiments, the system includes a second box channel base positioned perpendicularly with respect to the first box channel base. The second box channel base includes a pair of box channel supports extending vertically from each end of the second box channel base. Each of the box channel supports of the second box channel base holds at least two non-continuous portions of the length of the heat exchanger. In some instances, the first box channel base and the second box channel base have the same length so that the heat exchanger is coiled in a circular shape when supported by the first box channel base and the second box channel base.

In another aspect, a method of treating wastewater comprises conditioning sewage in the wastewater into a slurry and pumping the slurry through a first fluid tube. A heat transfer fluid is pumped through a second fluid tube. The first fluid tube is adjacent to the second fluid tube within a first casing so that the wastewater and the heat transfer fluid are separated by walls of the first fluid tube and the second fluid tube that is adjacent the first fluid tube. The first casing is positioned within a second casing and insulation having an RSI of at least 0.8 $m^2 \cdot K/W$ is present between the first casing and the second casing. The heat transfer fluid is pumped through the second fluid tube in a direction that is opposite to the direction in which the slurry is pumped through the first fluid tube. When the slurry is at a lower temperature than the heat transfer fluid, heat is transferred from the heat transfer fluid to the slurry. When the slurry is at a higher temperature than the heat transfer fluid, heat is transferred from the slurry to the heat transfer fluid.

In some embodiments, the slurry is at a lower temperature than the heat transfer fluid, the heat transferred from the heat transfer fluid to the slurry is sufficient to raise the temperature of the slurry to 75° F. In some examples, the temperature of the heat transfer fluid is 90° F.-130° F.

In some embodiments, the heat source for the heat transfer fluid is a solar thermal panel.

In some embodiments, the method of treating wastewater further includes a third fluid tube. The third fluid tube is positioned within the first casing and adjacent to the first fluid tube to allow heat transfer between the wastewater and a fluid within the third fluid tube. The heat transfer fluid in the third fluid tube is pumped through the third fluid tube in a direction that is opposite to the direction in which the slurry is pumped through the first fluid tube.

DESCRIPTION OF THE SELECTED EMBODIMENTS

Figure 1:
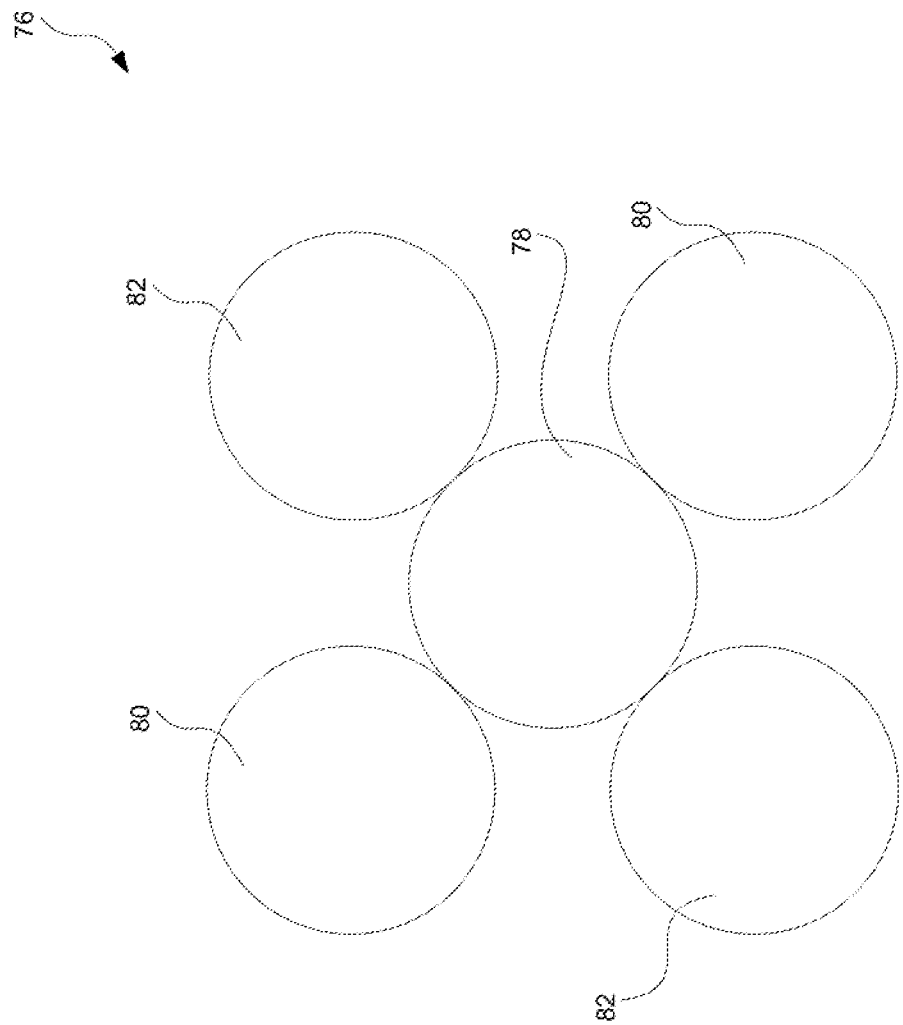
FIG. 1 is a diagrammatic illustration of how multiple piping or conduit lines may be arranged for heat transfer.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

For some contaminated wastewater fluids it may be difficult to add or remove heat because of the chemistry of the fluid or because of the quantity or size of solids in the fluid. In some instances, the contaminated fluid may be a product fluid that needs to be heated or cooled, for example in order to be treated and decontaminated. In other instances, the contaminated fluid may be a source fluid that serves as a heat rejection or a heat absorption source for another fluid that needs to be heated or cooled. The source fluid may be a renewable energy, low temperature cooling source (−35° F.-75° F.) when cooling is desired, or the source fluid may be a heating source (−50° F.-130° F.) when heating is desired. In some embodiments, one or multiple conduits can be used to carry either the source fluid or the product fluid. These separate source and product conduits form a multi-conduit heat exchanger. As described in further detail below, in some embodiments, the conduits may be located within a tube and surrounded by a heat transfer enhancer media.

One possible arrangement 76 of flow conduits for use as part of the exemplary embodiments is diagrammatically illustrated in FIG. 1. In the FIG. 1 arrangement, a wastewater conduit 78 is centered and surrounded by two geothermal loop supply conduits 80 and by two geothermal loop return conduits 82. In this example, the geothermal loop conduits 80, 82 are used for a source fluid. This pattern is described herein as a "four-corners" pattern due to the placement of conduits 80 and 82 around conduit 78. In some instances, such as a pressure sewer system, it is expected that the full cross-sectional area of the wastewater conduit 78 will be filled with wastewater. As such, there will be a balanced pattern of heat transfer, regardless of where the geothermal loop conduits are positioned relative to conduit 78. In terms of specifics and with continued reference to FIG. 4, each conduit 78, 80 and 82 is preferably a 1.25 inch diameter pipe.

Figure 2:
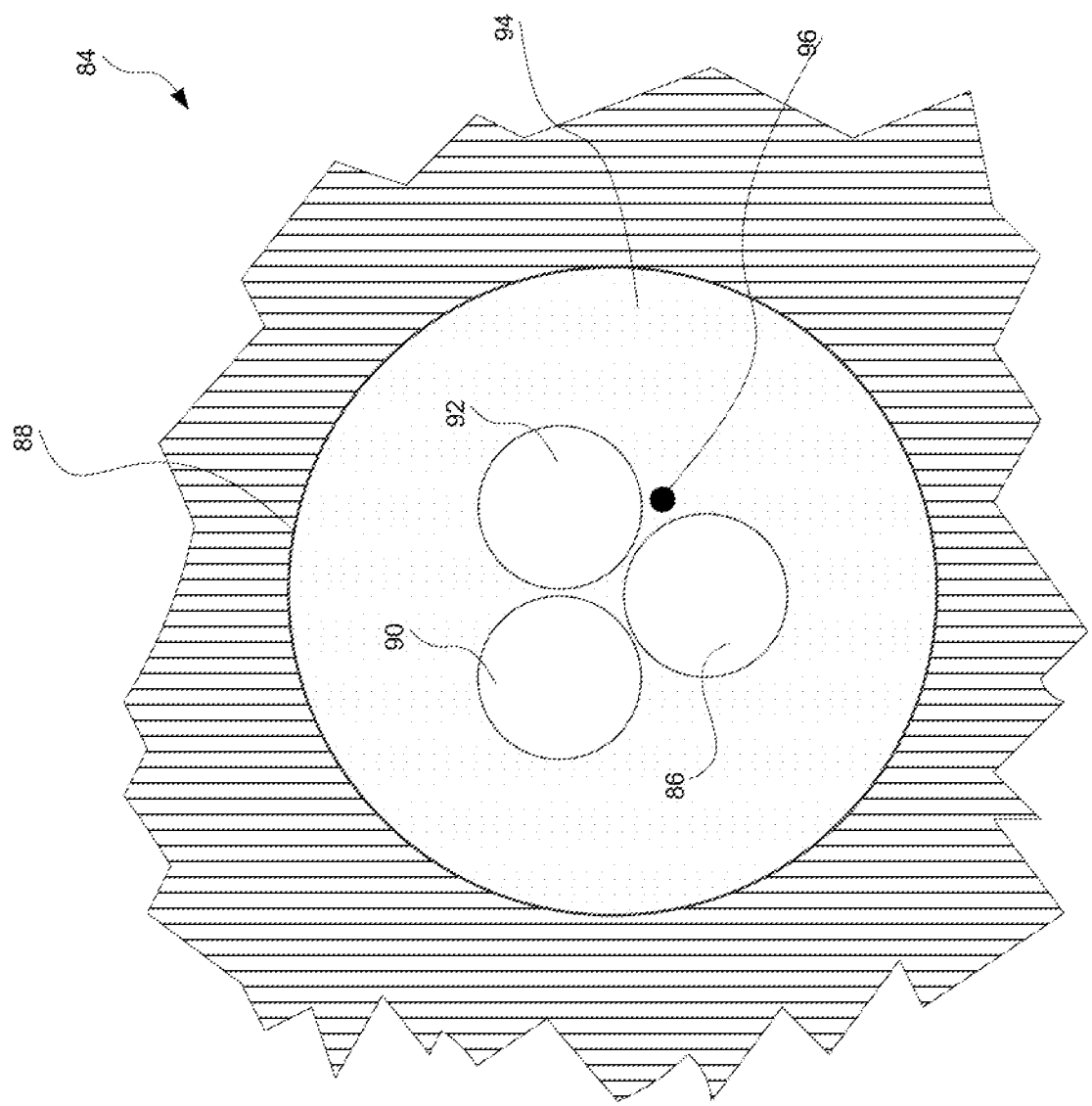
FIG. 2 is a diagrammatic illustration as to how a heat exchanger can be combined for heat transfer.

Referring now to FIG. 2 another possible arrangement 84 of flow conduits is diagrammatically illustrated. In the arrangement shown in FIG. 5, a wastewater conduit 86 is positioned to one edge of a bore hole 88. A geothermal loop supply conduit 90 is positioned in close proximity to conduit 86. A geothermal loop return conduit 92 is positioned in close proximity to conduit 86. The bore hole 88 may optionally be filled with an enhanced heat transfer grout 94. Also shown in FIG. 2 is a trace wire 96.

Figure 3:
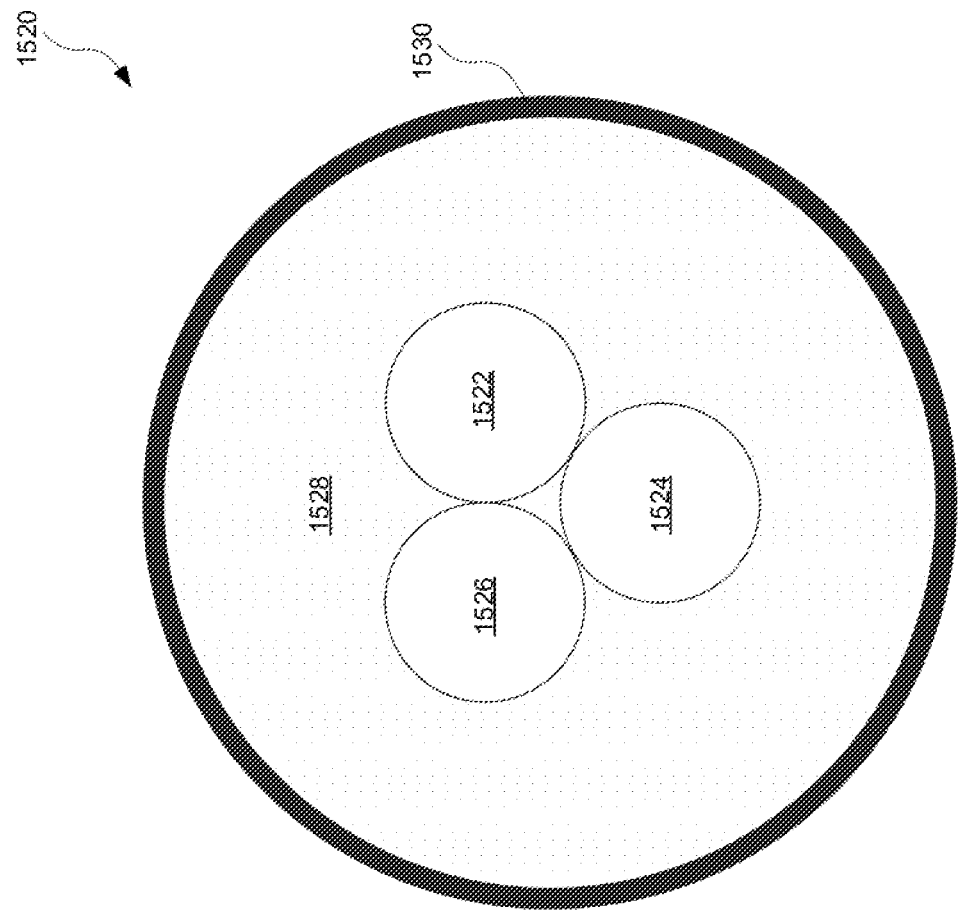
FIG. 3 is a cross-sectional view of a linear heat exchanger.

Referring to FIG. 3 another variant on the FIG. 1 construction is illustrated. Arrangement 1520 provides a suitable construction for a linear heat exchanger for potable and non-potable water related to process and wastewater heating or cooling. The heat exchanger can also be used for large building and industrial heat transfer/heat recovery. Arrangement 1520 includes a first fluid tube 1522, a second fluid tube 1524, and a third fluid tube 1526. The fluid tubes 1522, 1524, 1526 are surrounded by closed cell insulation and encased by an outer waterproof solid casing 1530.

The first fluid tube 1522 may be connected to utilities such as a pressure sewer system. Notably, in a pressure sewer system the grinder pump "conditions" lumpy wastewater into a slurry by chipping the solids into smaller pieces (e.g., having an average maximum diameter of ⅛ of an inch or less). Other utilities can supply geothermal boost capacity such as potable water, reuse water, sump pump discharge water, and/or rain water.

A heat exchanger can be designed to transfer heat into or out of "conditioned" wastewater to provide geothermal boost capacity. Alternatively, it can be used to add heat to sewage/wastewater to improve wastewater treatment performance in cold climates.

Figure 4:
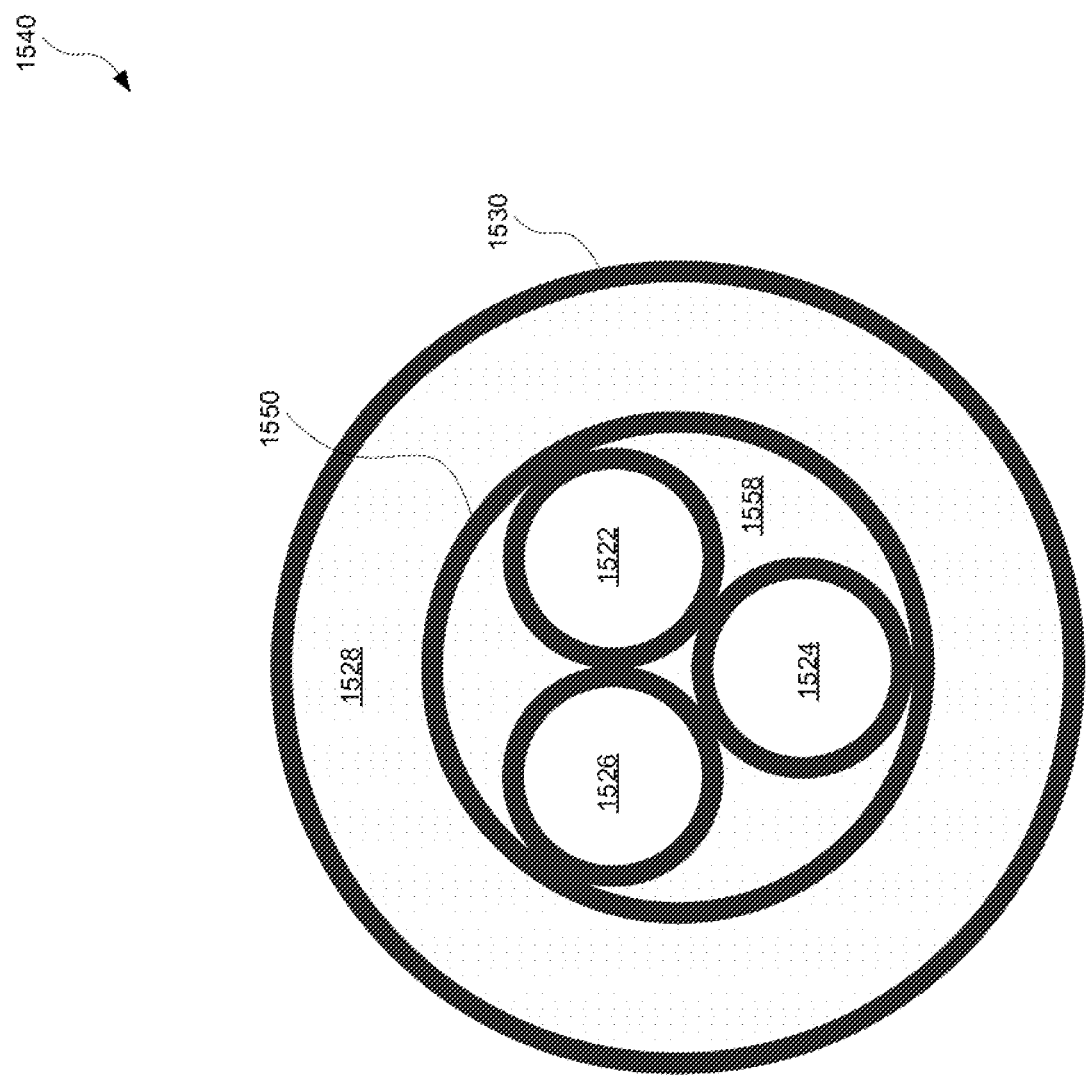
FIG. 4 is a cross-sectional view of a linear heat exchanger within a solid casing.

Referring to FIG. 4 another variant on the FIGS. 2 and 3 construction is illustrated. A heat exchanger 1540 provides a suitable construction for a linear heat exchanger for potable and non-potable water related to process and wastewater heating or cooling. The heat exchanger 1540 can also be used for large building and industrial heat transfer/heat recovery.

Similar to the embodiment shown in FIG. 3, the heat exchanger 1540 includes first fluid tube 1522, second fluid tube 1524, and third fluid tube 1526. The first fluid tube 1522 is configured to allow for a flow of wastewater through the first fluid tube 1522. In some instances, the wastewater may operate as a production fluid that is to be heated or cooled. In other instances, the wastewater may operate as a source fluid that is used for heat absorption or heat rejection for another fluid that is to be heated or cooled. As an example, discharge sewage from a commercial building that is at about 70° F. can operate as an effective source fluid.

The second fluid tube 1524 and the third fluid tube 1526 are each configured to allow a flow of a heat transfer fluid through the second fluid tube 1524 and/or through the third fluid tube 1526. In some embodiments, the heat transfer fluid may be a hydronic heating or cooling fluid. Similar to the wastewater in first fluid tube 1522, the heat transfer fluid may act as a source fluid that is used for heat absorption or heat rejection or may act as a production fluid to be heated or cooled.

An inner casing 1550, or a first casing, surrounds the first fluid tube 1522, the second fluid tube 1524, and the third fluid tube 1526. Heat transfer enhancement grout 1558 is located within the inner casing 1550 and fills in empty space between the tubes 1522, 1524, 1526 and the inner casing 1550. In some embodiments, the materials separating the wastewater in the first fluid tube 1522 and the heat transfer fluids in the second fluid tube 1524 and third fluid tube 1526 has an RSI value of less than 0.6 m$^2$·K/W to allow heat transfer between the wastewater in said first fluid tube and the heat transfer fluid in said second fluid tube.

An outer casing 1530, or second casing, surrounds the inner casing 1534, and insulation 1528 fills in the empty space between the outer casing 1530 and the inner casing 1550. In some examples, the insulation 1528 within the outer casing 1530 and surrounding the inner casing 1550 has an RSI value of at least 0.8 m$^2$·K/W. In some examples, the insulation 1528 may be a closed cell insulation.

In some embodiments, the fluid that runs through the first fluid tube 1522 flows in an opposite direction to the source fluids in the second fluid tube 1524 and the third fluid tube 1526. This creates an efficient counterflow heat transfer due to the fact that the production fluid in the first fluid tube 1522 is in contact with the warmest (when heating the production fluid) or coldest (when cooling the production fluid) source fluid entering the heat exchanger 1540.

In some embodiments, heat transfer fluid entering the second fluid tube 1524 and/or the third fluid tube 1526 is at a higher temperature than the wastewater entering in the first fluid tube 1522. Heat from the second fluid tube 1524 and/or the third fluid tube 1526 may be transferred to the wastewater in the first fluid tube 1522 to a degree sufficient to activate microbes in the wastewater and increase treatment capacity. As one example, the ideal atmosphere for aerobic microbes decomposing waste in the wastewater is a temperature between 77° F. and 95° F. Therefore, the heat transfer fluid in the second fluid tube 1524 and/or the third fluid tube 1526 has sufficient heat to raise the temperature of the wastewater to at least 77° F., but not greater than 95° F.

In other embodiments, heat transfer fluid entering the second fluid tube 1524 and/or the third fluid tube 1526 is at a lower temperature than the wastewater entering the first fluid tube 1522. Heat from the wastewater is transferred to the heat transfer fluid to a degree sufficient to prohibit microbes in the wastewater from becoming anaerobic.

In some embodiments, the number of tubes included in the heat exchanger 1540 may be modified as needed so that there are either more or fewer tubes. As an example, heat exchanger 1540 may include only the first fluid tube 1522 and the second fluid tube 1524. In other examples, heat exchanger 1540 may include four or more fluid tubes. Additionally, the size of the tubes, the length of the tubes, and/or the relative temperature of the fluids running through tubes 1522, 1524, 1526 may be determined on the project for which the heat exchanger 1540 is being used.

There are several different possible uses for the heat exchanger 1540. In a first example, a wastewater pumped slurry is pumped through the first fluid tube 1522. A solar thermal heat recovery fluid or a fluid heated by a boiler runs through the second fluid tube 1524 and the third fluid tube 1524 and is used as a source fluid to heat the wastewater slurry. Heating the wastewater can be used as part of a treatment process to improve treatment efficiency.

In another embodiment, air or an adiabatic cooler is used as a source fluid that runs through the second fluid tube 1524 and the third fluid tube 1524. The source fluid is used for heat rejection to cool the wastewater pumped slurry that runs through the contaminated fluid tube 122. Cooling the wastewater slurry can be used as part of a treatment process to improve treatment efficiency.

In another embodiment, the heat source fluid is a sewage discharge slurry from a residence or a commercial or industrial building that runs through the first fluid tube 1522. Condenser water for heat rejection or evaporator water for heat absorption runs through the second fluid tube 1524 and the third fluid tube 1524. The building plumbing system wastewater sewage ejector discharge is typically held near 70° F. and can be used for either heat rejection or heat absorption depending on whether condenser water or evaporator water is running through tubes 1524, 1526.

In another embodiment, a geothermal source fluid is pumped through the first fluid tube 1522. The fluid running through the second fluid tube 1524 and the third fluid tube 1524 is either condenser water or evaporator water. The geothermal source fluid either provides heat rejection for the condenser water or heat absorption for the evaporator water. In some embodiments, the geothermal source fluid may be from the earth, a lake, a river, brackish water, or sea water. This embodiment may be used for a compressor-based, water source heating/cooling system and domestic hot water production. It may also be used for heating or cooling wastewater for improved treatment.

In another embodiment, the heat source fluid that runs through the first fluid tube 1522 is potable or non-potable well water or city water with a dual wall design for atmospheric pressure between walls. This type of setup can be used or modified as necessary for code compliance. The fluid running through the second fluid tube 1524 and the third fluid tube 1524 is either condenser water or evaporator water. The well water or city water either provides heat rejection for the condenser water or heat absorption for the evaporator water. This embodiment may be used for compressor based, water source heating/cooling system and domestic hot water production.

In another embodiment, sump pump water from the perimeter of a building foundation or a specially designed dewater tank system and pump runs through the first fluid tube 1522. The fluid running through the second fluid tube 1524 and the third fluid tube 1524 is either condenser water or evaporator water. The sump pump water either provides heat rejection for the condenser water or heat absorption for the evaporator water. This embodiment may be used for compressor based, water source heating/cooling system and domestic hot water production.

Figure 5:
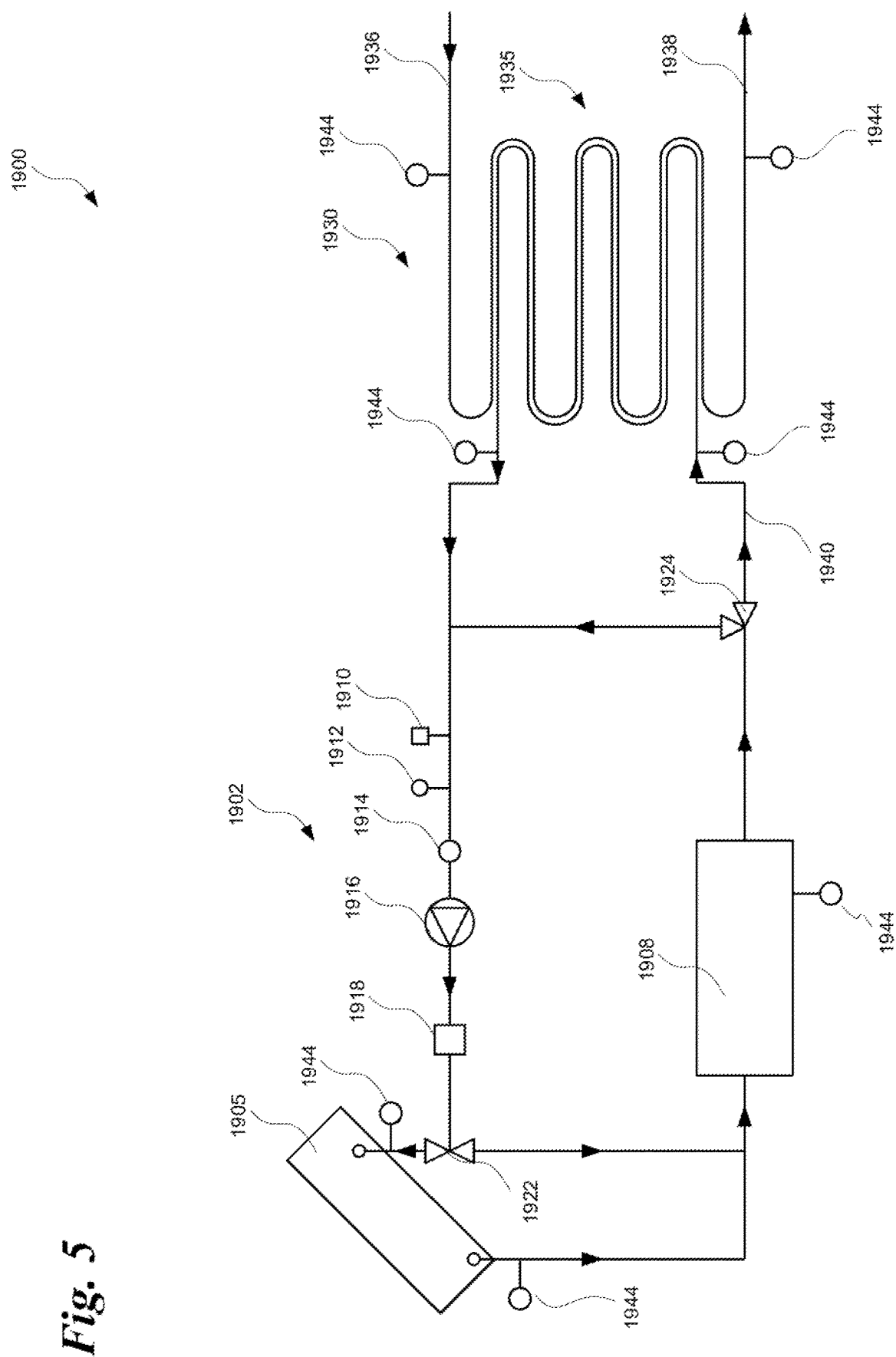
FIG. 5 is a diagrammatic illustration of a wastewater treatment boost system.

FIG. 5 illustrates a diagram of a wastewater treatment boost system 1900 that includes solar thermal wastewater heating. In some embodiments, the wastewater treatment boost system 1900 may include the use of heat exchanger 1540 like the type shown in FIG. 4. The wastewater treatment boost system 1900 includes a heat exchange fluid loop 1902 including a solar panel 1905 or multiple solar panels 1905. The solar panel 1905 may include optional summer covers. The solar panel 1905 is in fluid communication with a thermal storage tank 1908. Heat exchanger fluid loop 1902 also includes an auto glycol feed tank 1910, an expansion tank 1912, an air separator 1914 that may include an auto air vent, a fluid pump 1916, such as an electrically commutated motor heating fluid pump, and a flow meter 1918.

The auto glycol feed tank 1910 provides glycol for heat exchange fluid loop 1902 when needed to prevent freezing within heat exchange fluid loop 1902. The expansion tank 1912 serves as an overflow vessel for absorbing excess fluid volume in heat exchange fluid loop 1902 and to assist in preventing possible issues with excessive fluid pressure. The air separator 1914 removes entrained air from the fluid that is circulating within heat exchange fluid loop 1902 upstream of the fluid pump 1916. The flow meter 1918 is downstream of the fluid pump 1916 and can be used to provide data as to the volume of the flow through heat exchange fluid loop 1902.

A solar panel bypass valve 1922 provides the option of sending the fluid in heat exchange fluid loop 1902 either to solar panel 1905 or to bypass the solar panel 1905 and instead be sent straight to the thermal storage tank 1908. Solar bypass valve 1922 allows the wastewater treatment boost system 1900 to be used with thermal storage only, for example when it is night time and the solar panel 1905 is not providing heat to the fluid running through heat exchange fluid loop 1902.

The wastewater treatment boost system 1900 also includes a wastewater heat exchanger loop 1930. The wastewater heat exchanger loop 1930 includes a heat exchanger 1935, which could be a coaxial heat exchanger, similar to the heat exchanger described above in FIG. 4. A heat exchanger bypass valve 1924 allows heated fluid from the heat exchange fluid loop 1902 to be introduced into the wastewater heat exchanger loop 1930 or to bypass the wastewater heat exchanger loop 1930 and to remain within the heat exchange fluid loop 1902. The heated fluid from the heat exchange fluid loop 1902 enters the heat exchanger 1935 through heat exchanger supply pipe 1940. The wastewater heat exchanger loop 1930 also includes a cold wastewater supply pipe 1936 and a warm wastewater outlet pipe 1938. The cold wastewater supply pipe 1936 allows cold wastewater to flow to the heat exchanger 1935 where the cold wastewater is heated by the heated fluid from heat exchange fluid loop 1902 that enters the heat exchanger through heat exchanger supply pipe 1940. The warm wastewater outlet pipe 1938 sends the warmed wastewater to a treatment plant or other sort of treatment facility.

Temperature sensors 1944 are placed at various points along both the heat exchange fluid loop 1902 and the wastewater heat exchanger loop 1930 to monitor the temperature of the fluid flowing through the loops 1902, 1930. In the embodiment shown, temperature sensors 1944 are located near the inlet and the outlet of the solar panel 1905, at the thermal storage tank 1908, at heat exchanger supply pipe 1940 near the inlet and the outlet to the heat exchanger 1935, on the cold wastewater supply pipe 1936, and on the warm wastewater outlet pipe 1938.

Wastewater treatment boost system 1900 operates to provide heat to cold wastewater in an effort to improve efficiency at wastewater treatment plants. The heat transfer fluid in the heat exchanger fluid loop 1902 is heated by the solar panel 1905 and stored in thermal storage tank 1908. The heated heat transfer fluid is sent through the heat exchanger bypass valve 1924 into the heat exchanger 1935 in the wastewater heat exchanger loop 1930. Heat from the heat transfer fluid is transferred to the cold wastewater in the heat exchanger 1935 to raise the temperature of the wastewater. As shown, the heat transfer fluid from heat exchanger fluid loop 1902 flows in the opposite direction in heat exchanger 1935 as the wastewater introduced from the cold wastewater supply pipe 1936.

Figure 6:
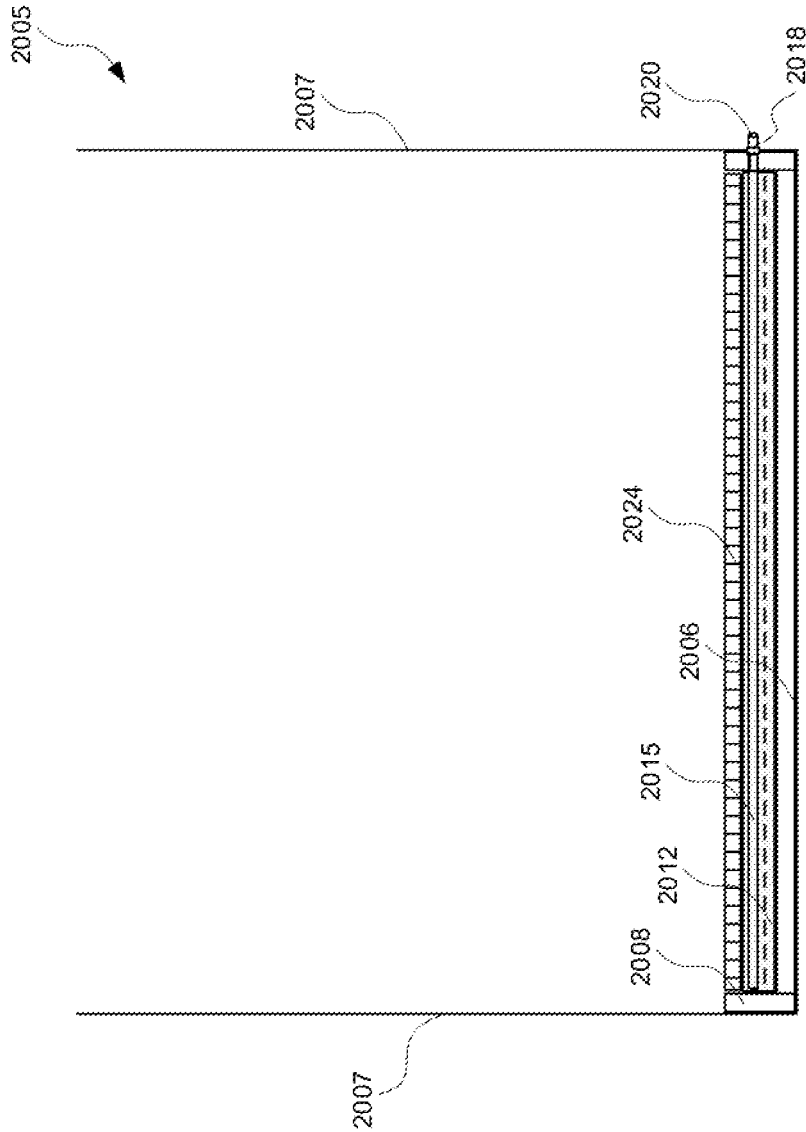
FIG. 6 is a cross-sectional view of a wastewater treatment tank.

FIG. 6 illustrates a wastewater treatment tank 2005 that incorporates thermal heating to boost wastewater temperature and to increase microbe activity. The wastewater treatment tank 2005 acts as a type of radiator that includes pipes embedded in concrete installed in the bottom of the wastewater treatment tank 2005. The wastewater treatment tank 2005 includes board insulation 2008 that lines the bottom surface 2006 of the wastewater treatment tank 2005 and a portion of the interior of the side walls 2007 of the wastewater treatment tank 2005. A wire mesh grid 2012 is positioned on top of the board insulation 2008. The wire mesh grid 2012 may include pipe hold down straps that attach to a heating pipe 2015 that runs through the wastewater treatment tank 2005. In some embodiments, the heating pipe 2015 may be a PEX hydronic heating pipe. The heating pipe 2015 extends through a side wall 2007 of the wastewater treatment tank 2005 at a heating pipe connection coupling 2018 and leads to a heating pipe inlet/outlet 2020. A concrete thermal storage or radiator 2024 is positioned above the wire mesh grid 2012 and the heating pipe 2015.

A heated liquid that circulates through the heating pipe 2015 radiates heat to the surrounding wire mesh grid 2012 and to the concrete thermal radiator 2024. The concrete thermal radiator 2024 is capable of adding additional heat to wastewater that flows through the wastewater treatment tank. The additional heat may be used to offset any heat loss in the wastewater due to colder, ambient temperatures that surround the wastewater treatment tank 2005.

Figure 7:
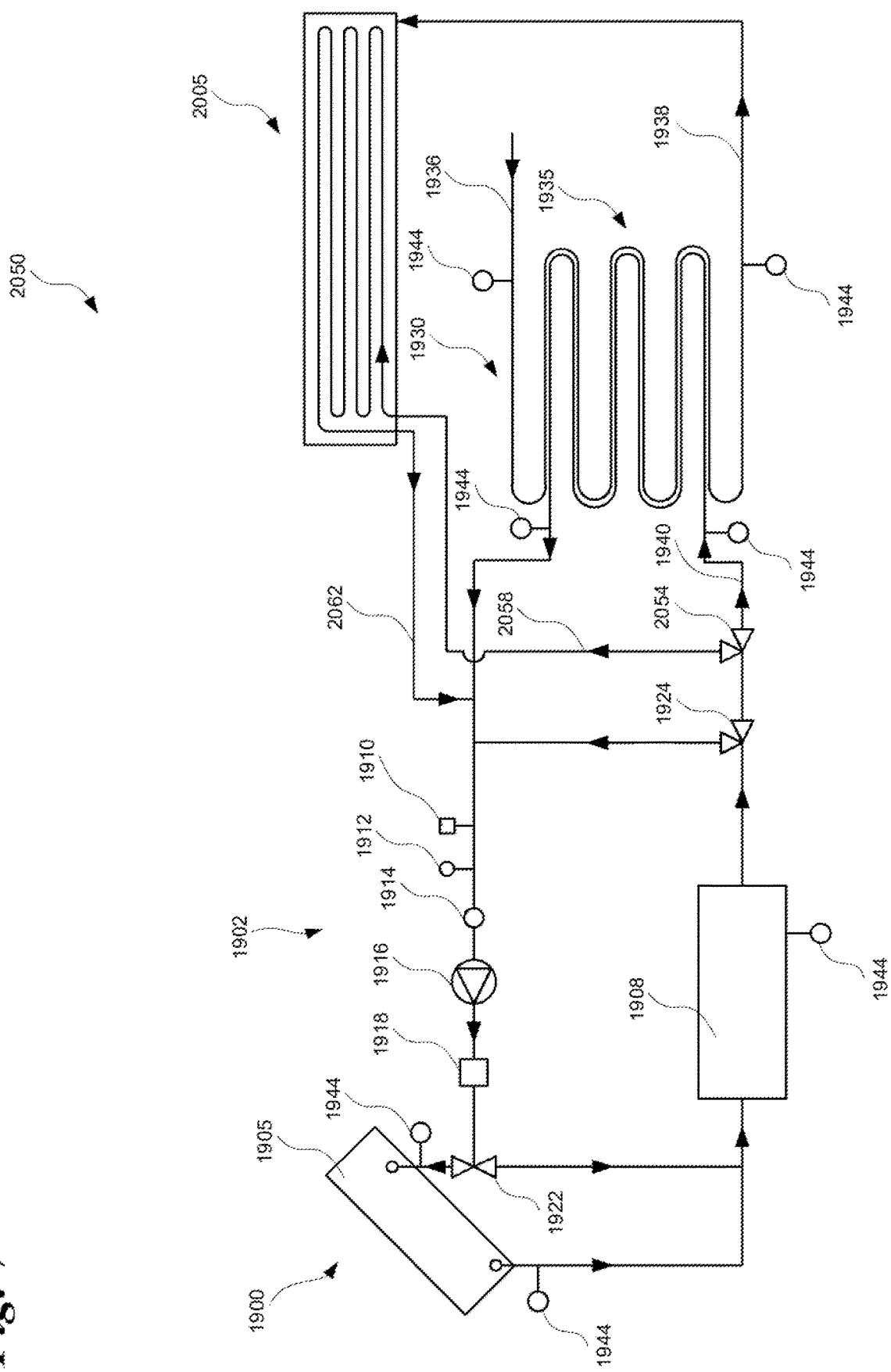
FIG. 7 is a diagrammatic illustration of wastewater treatment boost tank heating system including the wastewater treatment tank of FIG. 6.

FIG. 7 illustrates a wastewater treatment boost tank heating system 2050. The wastewater treatment boost tank heating system 2050 combines the wastewater treatment boost system 1900 shown in FIG. 5 and the wastewater treatment tank 2005 shown in FIG. 6. The wastewater treatment boost tank heating system 2050 may be used as a low-energy, cold weather treatment system.

In the wastewater treatment boost tank heating system 2050, heated fluid from the heat exchanger fluid loop 1902 exits the storage tank 1908 and is sent to the heat exchanger bypass valve 1924. At the heat exchanger bypass valve 1924, the heated fluid may be returned to the heat exchanger fluid loop 1902 or may continue toward a modulating control valve 2054. The modulating control valve 2054 can send the heated fluid through either the wastewater heat exchanger loop 1930 or directly to the wastewater treatment tank 2005.

If the modulating control valve 2054 sends the heated fluid directly to the wastewater treatment tank 2005, the heated fluid is delivered to the wastewater treatment tank 2005 by a treatment tank heating water supply 2058. Heat from the heated fluid is transferred to wastewater stored in the wastewater treatment tank 2005 and then exits through a treatment tank heating water return 2062. The treatment tank heating water return 2062 delivers the now cooled fluid back to the heat exchange fluid loop 1902 where it is reheated.

If the modulating control valve 2054 sends the heated fluid through the wastewater heat exchanger loop 1930 through the heat exchanger supply pipe 1940 as described in FIG. 5. The cold wastewater supply pipe 1936 supplies cold wastewater to the heat exchanger 1935 where the cold wastewater is heated by the heated fluid from heat exchange fluid loop 1902 that enters the heat exchanger through heat exchanger supply pipe 1940. The heated wastewater then exits the heat exchanger 1935 through the warm wastewater outlet pipe 1938 and circulates to the wastewater treatment tank 2005.

Although the wastewater treatment boost system 1900 and the wastewater treatment boost tank heating system 2050 is shown with a solar panel 1905 as the thermal source for the heating fluid, in other embodiments, other suitable thermal sources may be used. As an example, the thermal source may be an electric or a carbon source boiler. In some embodiments, the thermal source may be able to produce a heated fluid that has a temperature of 90° F.-130° F. even on cold or cloudy days.

Additionally, the wastewater treatment boost system 1900 and the wastewater treatment boost tank heating system 2050 may be operated with a low horsepower grinder pump station for wastewater transfer and low horsepower heating fluid transfer pumps. The fluid transfer pumps may be powered by photovoltaic panels with a battery backup system. A renewable, low horsepower wastewater treatment system may be advantageous for municipal wastewater treatment plants that are located in remote areas, and may save costs on utilities for power and heating. Further upgrades may include using a lower temperature heat source such as condenser heat recovery from a chiller or process heat that may be used for wintertime wastewater heating.

Figure 8:
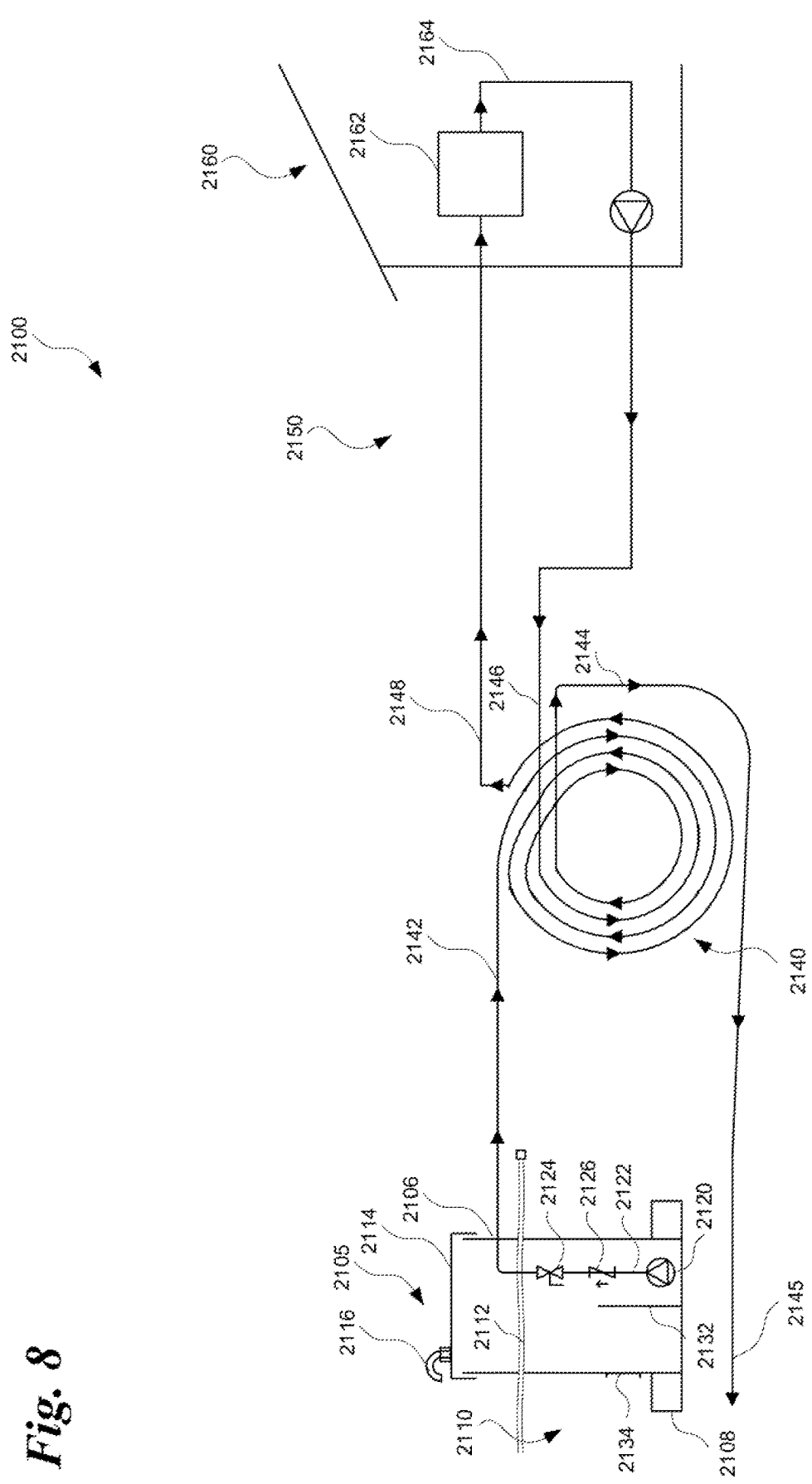
FIG. 8 is a diagrammatic illustration of a heat exchanger thermal system.

FIG. 8 illustrates a heat exchanger thermal system 2100 that uses an open source geothermal heat source, such as a river, brackish water or sea water, or a high water table pumping station. The heat exchanger thermal system 2100 includes a geothermal source 2105, a heat exchanger 2140, which could be a coaxial heat exchanger, and an HVAC loop 2150. The heat exchanger 2140 is similar to the heat exchanger 1540 described above, and is arranged in a spiral configuration and may be installed in water, underground, or in a building. The heat exchanger 2140 includes a heat exchanger source inlet 2142 and a heat exchanger source outlet 2144 that is in fluid communication with the geothermal source 2105 as described further below. The heat exchanger also includes a heat exchanger HVAC inlet 2146 and a heat exchanger HVAC outlet 2148 that are each in fluid communication with the HVAC loop 2150, also described further below.

The geothermal source 2105 includes a geothermal source tank 2106. The geothermal source tank 2106 may be made of fiberglass, poly, HDPE, or any other type of suitable material for holding water. The geothermal source tank 2106 is partially submerged in a water source 2110. The water source 2110 creates an operating level 2112 within the geothermal source tank 2106. In some embodiments, the geothermal source tank 2106 may include a cover 2114 and vent 2116 and may be capable of measuring the level of water stored within the geothermal source tank 2106. The geothermal source tank 2106 may include a ballast 2108 that acts as a base or a mounting system to secure the geothermal source tank 2106 and promote stability.

A geothermal source fluid pump 2120 is positioned within the geothermal source tank 2106. The geothermal source fluid pump 2120 is connected to a geothermal source discharge line 2122 that includes an isolation valve 2124 and a check valve 2126 for controlling the flow of fluid through the geothermal source discharge line 2122. A debris weir 2132 is positioned adjacent to the geothermal source fluid pump 2120 within the geothermal source tank 2106 to prevent debris from entering the geothermal source fluid pump 2120. Additionally, a debris filter 2134 is located on the geothermal source tank 2106 allowing water to enter the geothermal source tank 2106 but preventing large diameter debris from entering the geothermal source tank 2106.

The geothermal source discharge line 2122 is in fluid communication with a heat exchanger source inlet 2142 to heat exchanger 2140. The fluid that enters the heat exchanger source inlet 2142 runs through the heat exchanger 2140 and exits through the heat exchanger source outlet 2144. The fluid is then discharged back into the water source 2110 at a geothermal source discharge outlet 2145.

The heat exchanger thermal system 2100 also includes an HVAC loop 2150 that includes a structure 2160 that is to be heated or cooled, such as a residential building or a commercial building. The HVAC loop 2150 includes a HVAC fluid supply 2162 that supplies fluid to the HVAC system of the structure 2160. After the fluid has run through the HVAC system, the fluid is discharged from the HVAC fluid supply 2162 through a HVAC fluid supply outlet 2164. An HVAC circulating pump 2166 is in fluid communication with the HVAC fluid supply outlet 2164 and pumps the fluid to the heat exchanger HVAC inlet 2146 where the fluid is run through the heat exchanger 2140 to transfer heat with the fluid from the geothermal source 2105. After running through the heat exchanger 2140, the HVAC loop fluid exits through the heat exchanger HVAC outlet 2148 and is returned to the HVAC fluid supply 2162.

Figure 9:
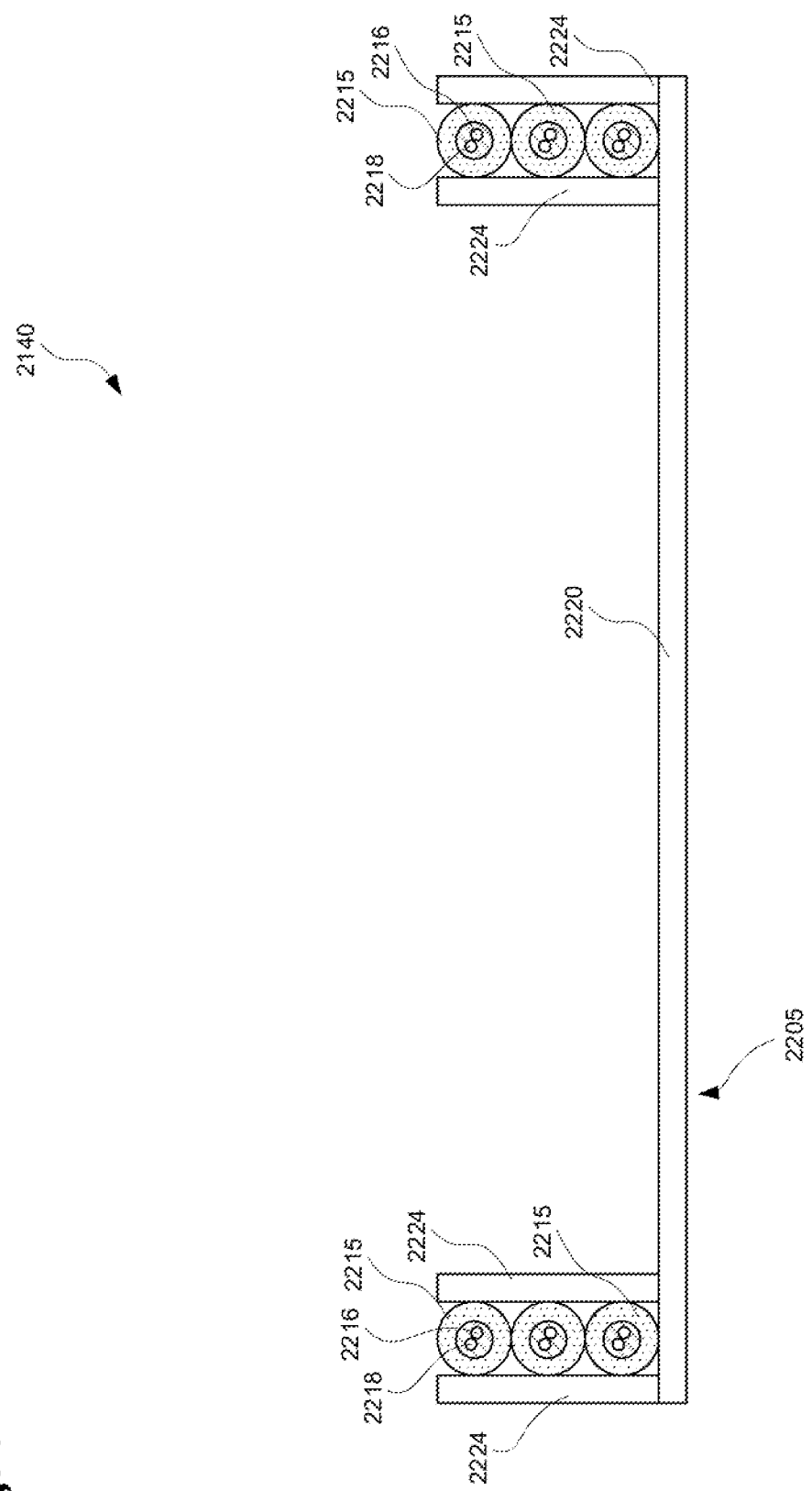
FIG. 9 is a cross-sectional view of a framework for stacking wound coils for a linear heat exchanger.

A framework 2205 to support stacked, wound coils of the heat exchanger 2140 is shown in FIG. 9. The framework 2205 includes a box channel base 2220 and box channel vertical supports 2224 that extend from each end of the box channel base 2220. A height of the box channel supports is at least double the height of the outer casing of the heat exchanger to allow at least two non-continuous portions of the length of the heat exchanger to be supported by the adjacent pair of box channel supports.

The heat exchanger includes heat transfer piping 2215, which has a similar to construction to the heat exchanger 1540 shown in FIG. 4. The casing for the cased heat transfer piping may be made from insulated PEX, polyurethane, or any other suitable material. The cased heat transfer piping 2215 includes a wastewater heat transfer pipe 2216 and a heating or cooling water pipe 2218 that is arranged with respect to the wastewater heat transfer pipe 2216 for counterflow operation.

A distance between the adjacent box channel vertical supports 224 is greater than the width of the outer casing of the heat exchanger 2140. As shown, the box channel vertical supports 2224 are tall enough to support multiple sections of the heat transfer piping 2215, so that the length of the heat transfer piping may be coiled or formed into a spiral. This allows increased length for the heat transfer piping 2215 to increase heat transfer in places where it may not be possible or practical to add additional length to the heat transfer piping 2215 in a lateral direction.

Figure 10:
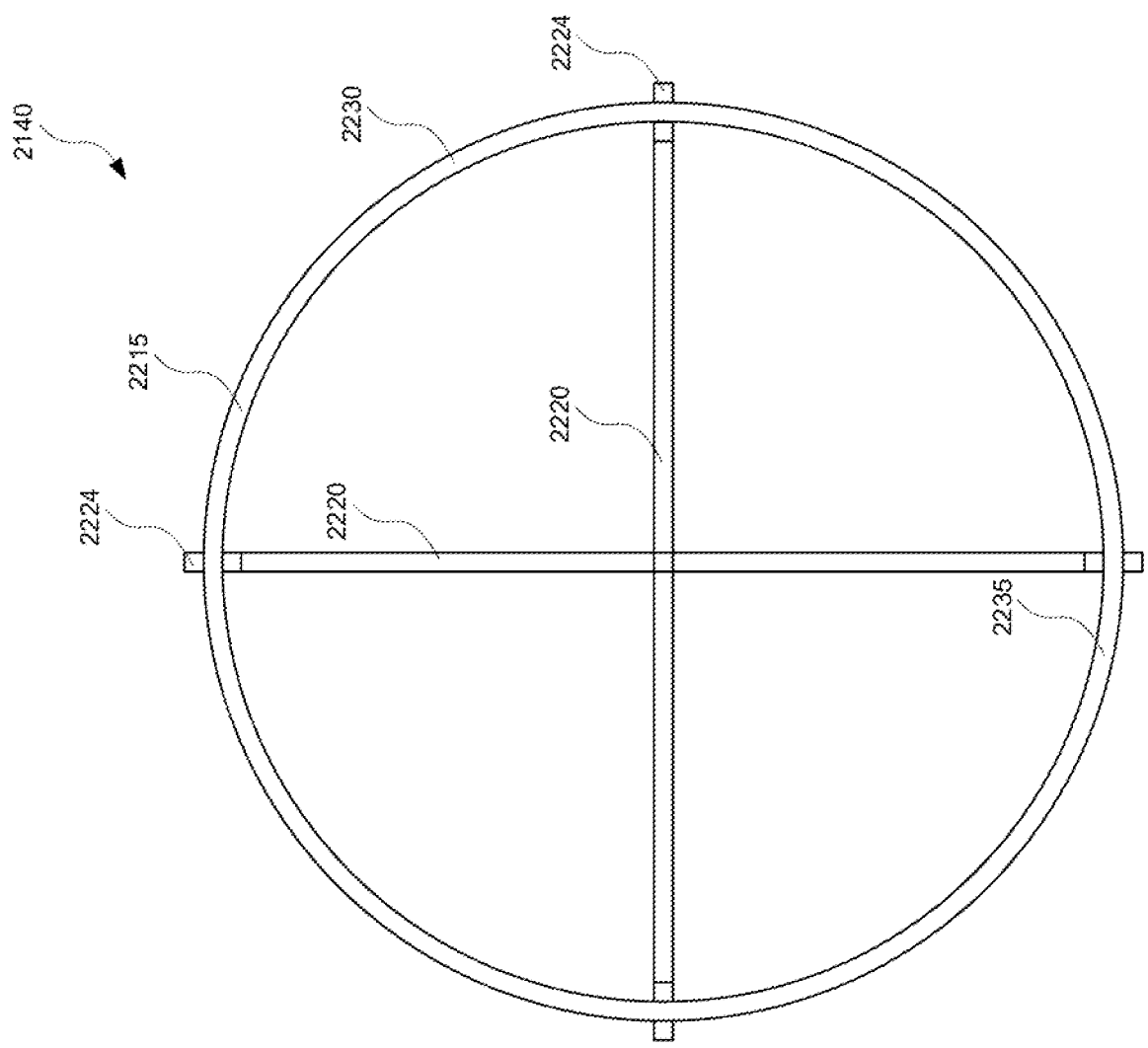
FIG. 10 is a top view of the framework of FIG. 9 in a circular wound configuration.

FIG. 10 illustrates a top, plan view of an embodiment of the heat exchanger 2140 in a circular wound configuration. There are two box channel bases 2220 of equal length arranged perpendicular to each other. Box channel vertical supports 2224 that hold and support the heat transfer piping 2215 are located at each end of the box channel bases 2220. The heat exchanger 2140 includes a connection 2230 for introducing wastewater into the wastewater heat transfer pipe and for discharging heating water fluid from the heating or cooling water pipe. The heat exchanger 2140 also includes a separate connection 2235 for discharging wastewater into the wastewater heat transfer pipe and for introducing heating water fluid into the heating or cooling water pipe.

Figure 11:
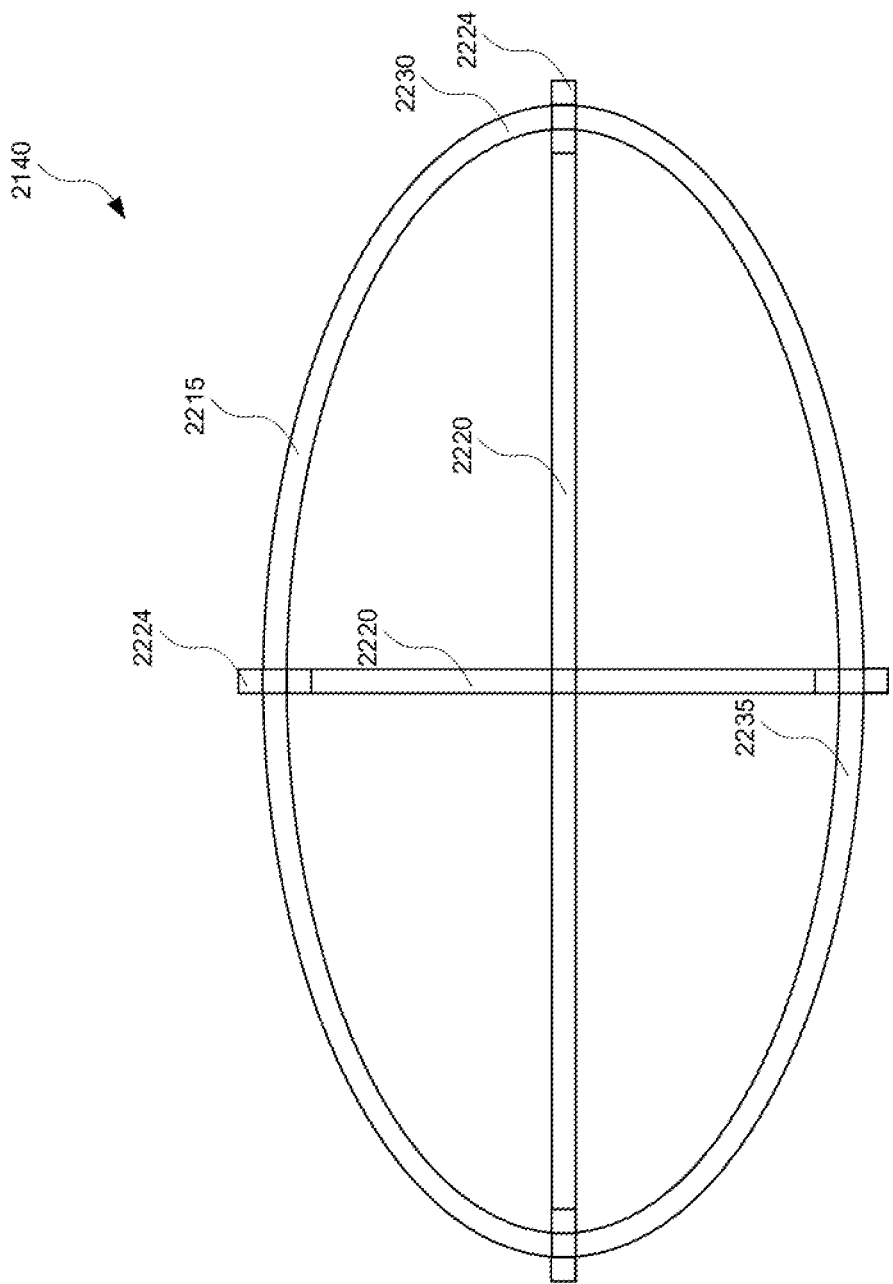
FIG. 11 is a top view of the framework of FIG. 9 arranged in an elliptical wound configuration.

FIG. 11 illustrates a top, plan view of an alternative embodiment of the heat exchanger 2140 in an elliptically wound configuration. In FIG. 11, the box channel bases 2220 are perpendicular to each other, but one of the box channel bases 2220 has a shorter length than the other box channel base 2220, so that the cased heat transfer piping 2215 forms an elliptical shape. Box channel vertical supports 2224 that hold and support the heat transfer piping 2215 are located at each end of the box channel bases 2220. Similar to FIG. 10, the heat exchanger 2140 includes a connection 2230 for introducing wastewater into the wastewater heat transfer pipe and for discharging heating water fluid from the heating or cooling water pipe. The heat exchanger 2140 also includes a separate connection 2235 for discharging wastewater into the wastewater heat transfer pipe and for introducing heating water fluid into the heating or cooling water pipe.

Figure 12:
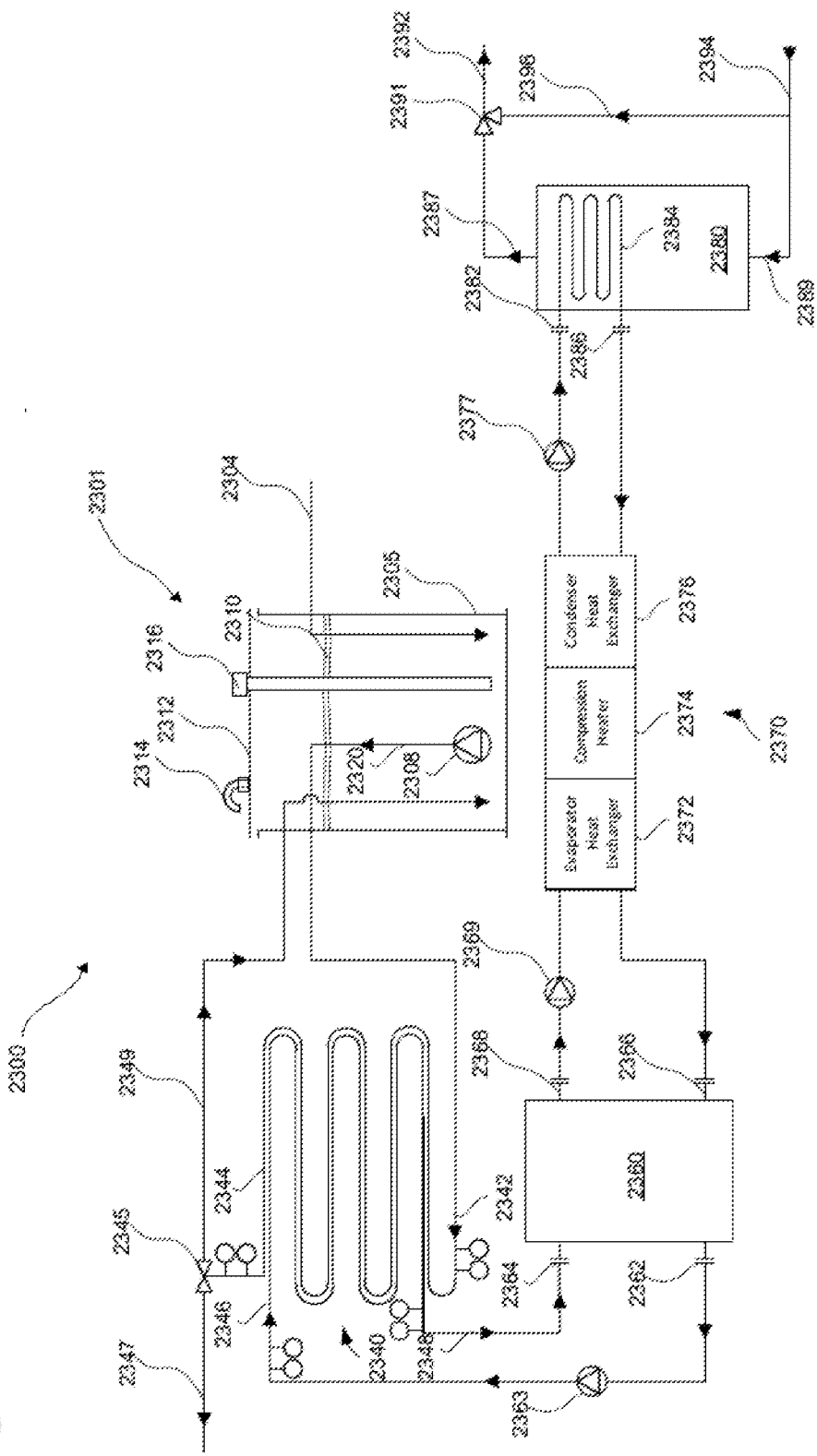
FIG. 12 is a diagrammatic illustration of a domestic hot water production system.

A domestic hot water production system 2300 using heat exchange with wastewater through a heat exchanger is illustrated in FIG. 12. As illustrative examples, the domestic hot water production system 2300 may be used in the lower level of a school, hospital, hotel, or other kind of commercial building that receives wastewater from restrooms, locker rooms, laundry, kitchen, floor drains, or any other suitable wastewater system. The sewage ejector pump system 2301 includes a wastewater line 2304 that feeds into a sewage ejector tank 2305. A grinder pump 2308 is positioned within the sewage ejector tank 2305 so that the grinder pump 2308 is submerged beneath the level of wastewater 2310 stored within the sewage ejector tank 2305. The sewage ejector tank 2305 may optionally include a sewage ejector tank cover 2312 and a sewage ejector tank vent 2314. A wastewater level control 2316 may monitor the level of wastewater 2310 within the sewage ejector tank 2305 and may include an alarm to provide an alert when the level of wastewater 2310 is at an undesired level. Wastewater stored in the sewage ejector tank 2305 is discharged by the grinder pump through a grinder pump discharge pipe 2320 that leads toward a heat exchanger 2340, which may be a coaxial heat exchanger.

The heat exchanger 2340 includes flow from the wastewater that is discharged from the sewage ejector tank 2305 by grinder pump 2308. Typically, the wastewater acts as a heat source for the heat exchanger 2340, and enters the heat exchanger 2340 at a wastewater inlet 2342. The waste water then runs through heat exchanger 2340 until it exits at a wastewater outlet 2344 that leads to a three-way valve. The wastewater may then be circulated to a pressure sewer discharge from the building through pressure sewage discharge pipe 2347, or the wastewater may be diverted back to the sewage ejector tank 2305 for additional heat transfer through a sewage ejector tank diversion pipe 2349.

The production fluid that is heated by the heat exchanger 2340 is supplied from a production water storage tank 2360. The production water storage tank 2360 includes a tank coaxial outlet 2362 and production fluid that exits the tank coaxial outlet 2362 is pumped by a production water pump 2363 to the heat exchanger 2340 through the coaxial production inlet 2346. Once in the heat exchanger 2340, the production fluid is heated via heat transfer with the wastewater that runs through the heat exchanger 2340. In some embodiments, the production fluid and the wastewater run in counterflow through the heat exchanger 2340 to improve efficiency of the heat transfer between the two fluids. The now warmed production fluid exits the heat exchanger 2340 at a coaxial production outlet 2348 and is circulated to a tank coaxial inlet 2364 that leads into the production water storage tank 2360.

The production water storage tank 2360 also includes a domestic hot water inlet 2366 and a domestic hot water outlet 2368 that allow production water storage tank 2360 to interact with a domestic hot water loop 2370. The domestic hot water loop 2370 includes an evaporator 2372, a compressor 2374, and a condenser 2376. In some embodiments, the compressor 2374 may be optimized for domestic hot water heating.

Fluid from the production water storage tank 2360 is pumped to evaporator 2372 by a heat absorption water pump 2369 where the fluid exchanges heat at the evaporator. The now cooled fluid after heat exchange is pumped back to the production water storage tank 2360 through the domestic hot water inlet 2366.

Hot fluid from the condenser 2376 is pumped to a domestic hot water tank 2380 by a condenser water pump 2377. The hot fluid enters the hot water tank 2380 at a hot water tank coil inlet 2382 and runs through a water heating coil 2384. Heat from the hot fluid is transferred to the water that is stored in the hot water tank 2380 so that heater water is available when necessary. After the fluid from the condenser runs through the water heating coil 2384, the fluid exits the hot water tank 2380 at a hot water tank coil outlet 2386 and is returned to the condenser 2376 to be heated again returned through the loop.

Heated water that is stored in the domestic hot water tank 2380 may be drawn from the domestic hot water tank 2380 through domestic hot water outlet 2387. The heated water then runs to a blending valve 2391. The blending valve 2391 is also fed potable water that is provided through a potable water line 2394 from the structure that is serviced by the domestic hot water tank 2380. The potable water may be diverted to the blending valve 2391 through the potable water blending line 2396 or may be delivered to the domestic hot water tank 2380. The potable water is mixed with the heated water from the domestic hot water tank 2380 at the blending valve 2391 to reduce the temperature of the heated water to an acceptable temperature for use. In some embodiments, this temperature may be around 115° F. This blended water is then delivered to the structure serviced by the domestic hot water tank 2380 for use. The use of heat from wastewater in the domestic hot water production system 2300 rather than relying on electricity like a standard electric domestic hot water heater can provide cost savings of 60-75%.

Figure 13:
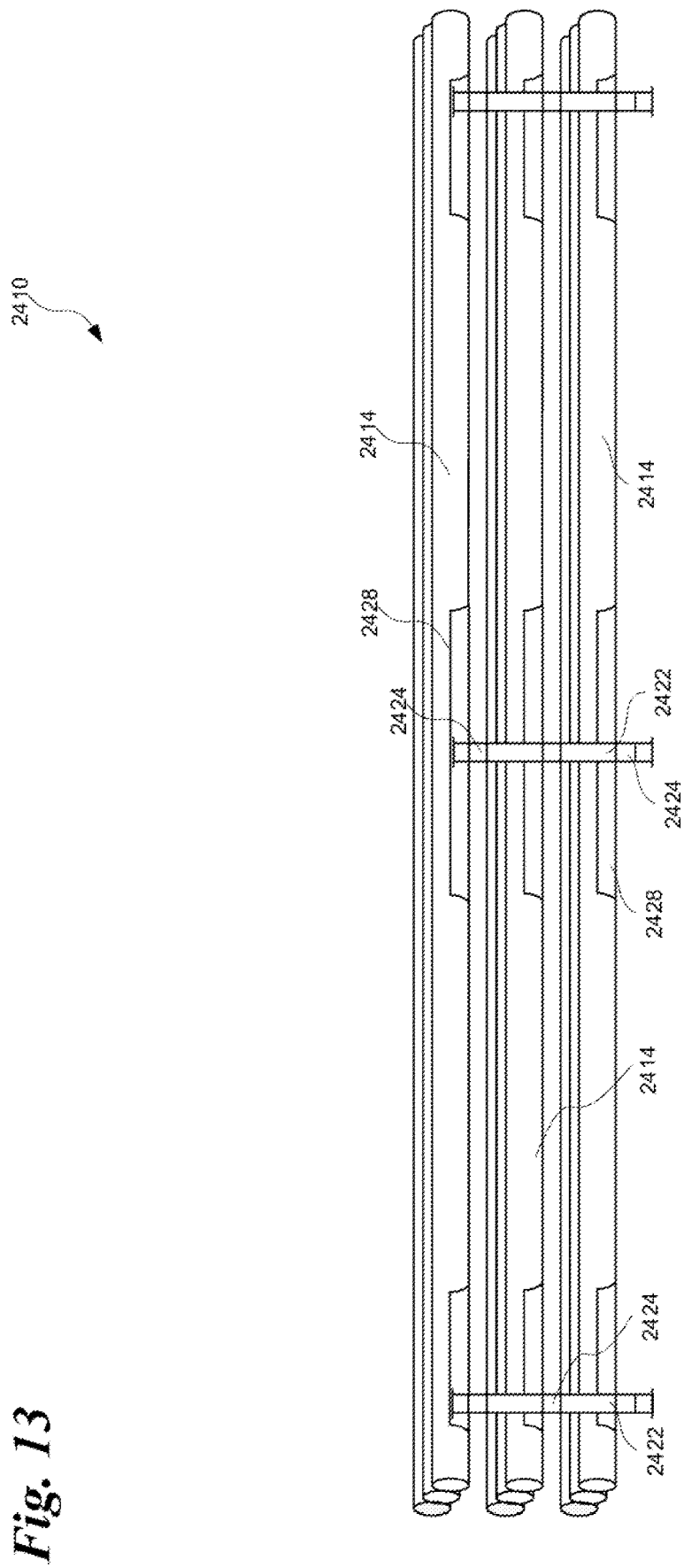
FIG. 13 is a side view of a heat exchanger arranged in a multiple pass configuration.

FIG. 13 is an elevation side view of a heat exchanger 2410, which may be a coaxial heat exchanger. Heat exchanger 2410 uses a multiple pass configuration. The multiple pass configuration allows the length of the heat exchanger 2410 to be increased without greatly increasing the amount of space needed for the heat exchanger 2410 by stacking tubing for the heat exchanger 2410 vertically.

The heat exchanger 2410 includes a plurality of coaxial tubes 2414. The coaxial tubes 2414 shown in this embodiment may be arranged as shown in FIG. 3 or FIG. 4, or may be any other coaxial arrangement suitable for heat exchange. The heat exchanger 2410 also includes a support framework that includes vertical supports 2422 that are spaced along the length of the coaxial tubes 2414. Each vertical support 2422 includes a corresponding vertical support 2422 positioned on the other side of the coaxial tubes 2414 (see FIG. 14). One or more horizontal supports 2424 extend between the corresponding vertical supports 2422. Each of the coaxial tubes 2414 is supported by a horizontal support 2424, and in some embodiments, a single horizontal support 2424 may provide support for multiple coaxial tubes 2414. In some embodiments, the heat exchanger 2410 may also include support cups 2428 made of a suitable material, such as steel, to provide additional support for the coaxial tubes 2414. The support cups 2428 may be attached to the vertical supports 2422 and/or the horizontal supports 2424.

Figure 14:
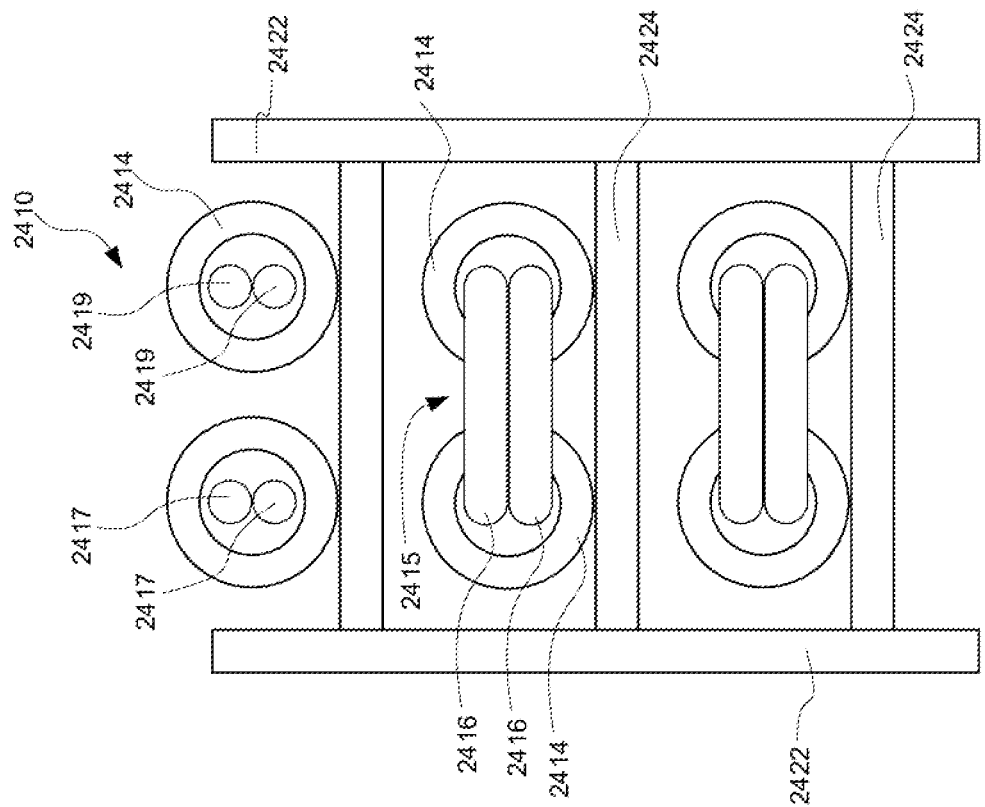
FIG. 14 is a front view of a heat exchanger arranged in a multiple pass configuration with U-bend connectors.
Figure 15:
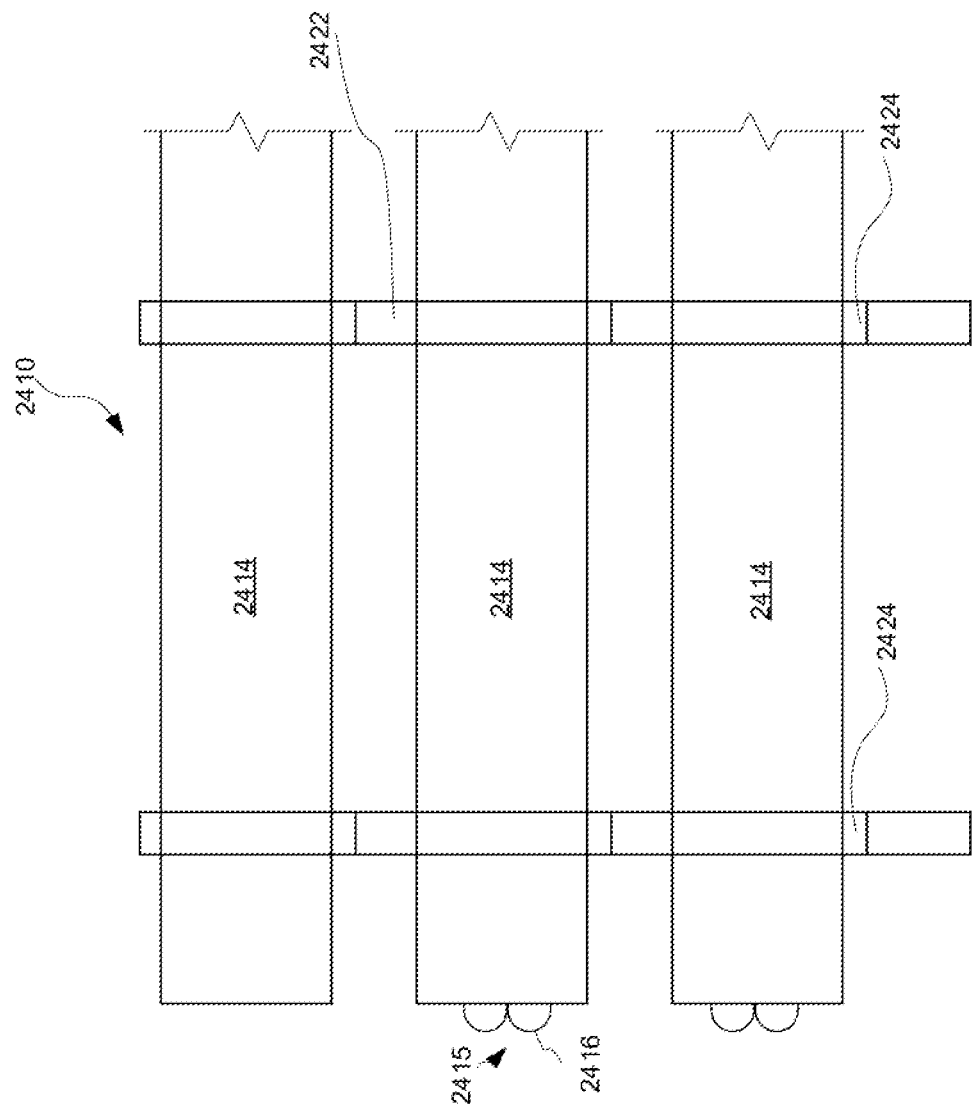
FIG. 15 is a side view of the heat exchanger of FIG. 14.

FIGS. 14 and 15 show an embodiment of heat exchanger 2410 that includes U-bend connectors 2415 for connecting the coaxial tubes 2414. As shown, pipes 2416 within a coaxial tube 2414 are bent in a U-shape after exiting one coaxial tube 2414 so that the pipes 2416 may enter an adjacent coaxial tube 2414 that is parallel to the coaxial tube 2414 that was exited. In the embodiment shown, the heat exchanger 2410 includes coaxial tubes 2414 that have two coaxial pipes 2416. In other embodiments, the heat exchanger 2410 may include more coaxial pipes 2416, for example, three or four pipes 2416. Although not shown in FIG. 14, a pipe 2416 may also bend between vertically adjacent coaxial tubes 2414 so that pipe 2416 may span between coaxial tubes 2414 on different horizontal supports 2424.

In the embodiment shown in FIG. 14, the inlets 2417 to pipes 2416 are positioned in a coaxial tube 2414 that is supported on the uppermost horizontal support 2424. The outlets 2419 of pipes 2416 are positioned in an adjacent coaxial tube 2414 that is also supported on the uppermost horizontal support 2424. Fluid for heat exchange enters heat exchanger at inlets 2417. Fluid runs through pipe 2416, using the U-bend connectors 2415 to flow between the different coaxial tubes 2414. Increasing the length of the pipe 2416 improves the amount of heat transfer between the fluids in adjacent pipes 2416. The U-bend connectors 2415 help to increase the length of the pipes 2416 without greatly increasing the amount of space occupied by the heat exchanger 2410.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The following numbered clauses set out specific embodiments that may be useful in understanding the present invention:

1. A method comprising:
   flowing wastewater into and through a first fluid tube;
   flowing a heat transfer fluid into and through a second fluid tube; wherein the heat transfer fluid entering the second fluid tube has a different temperature than the wastewater entering the first fluid tube;
   wherein said first fluid tube and said second fluid tube are positioned within a first casing;
   wherein said first casing is surrounded by insulation having an RSI of at least 0.8 m$^2$·K/W;
   wherein said first casing and said insulation are positioned within a second casing; and
   wherein said wastewater in said first fluid tube and said heat transfer fluid in said second fluid tube are separated by material having an RSI of less than 0.6 m$^2$·K/W to allow heat transfer between the wastewater in said first fluid tube and the heat transfer fluid in said second fluid tube.

2. The method of clause 1, wherein the first fluid tube is adjacent to the second fluid tube within the first casing so that the wastewater and the heat transfer fluid are separated by walls of the first fluid tube and the second fluid tube.

3. The method of any one of clauses 1-2, further comprising:
   a third fluid tube positioned within said first casing; and
   wherein the said wastewater in said first fluid tube and a fluid within said third fluid tube are separated by material having an RSI value (m$^2$·K/W) of less than 0.6 to allow heat transfer between the wastewater and the fluid within said third fluid tube.

4. The method of any one of clauses 1-3, wherein a heat transfer enhancement grout is positioned within said first casing and around at least a portion of said second fluid tube.

5. The method of any one of clauses 1-4, wherein said insulation is a closed cell type insulation.

6. The method of any one of clauses 1-5, wherein the wastewater within said first fluid tube flows in an opposite direction of the heat transfer fluid within said second fluid tube.

7. The method any one of clauses 1-6, wherein said wastewater is at least one of sewage, surface storm water, lake water, river water, or brackish water.

8. The method any one of clauses 1-7, wherein said heat transfer fluid entering said second fluid tube is at a higher temperature than said wastewater entering said first fluid tube, and wherein heat from said heat transfer fluid in said second fluid tube is transferred to said wastewater to heat the wastewater to a degree sufficient to activate microbes in the wastewater and increase treatment capacity.

9. The method of any one of clauses 1-8, wherein said heat transfer fluid entering said second fluid tube is at a lower temperature than said wastewater entering said first fluid tube, and wherein heat from the wastewater is transferred to the heat transfer fluid to a degree sufficient to reduce microbes in the wastewater from becoming anaerobic.

10. The method of clause 9, wherein said heat transfer fluid communicates with a heating, ventilation, and air conditioning (HVAC) system of a building.

11. A system comprising:
    a heat exchanger having a length, wherein said heat exchanger comprises:
      a first fluid tube having a flow of wastewater into and through said first fluid tube;
      a second fluid tube having a flow of heat transfer fluid into and through said second fluid tube;
      wherein the heat transfer fluid entering the second fluid tube has a different temperature than the wastewater entering the first fluid tube;
      wherein said first fluid tube and said second fluid tube are positioned within a first casing;
      wherein an insulation surrounds said first casing; and
      wherein said first casing and said insulation are positioned within an outer casing having a width and a height;

a framework configured to support the heat exchanger, wherein said framework includes:
  a first box channel base including a first end and a second end;
  a pair of box channel supports extending vertically from each end of said first box channel base, wherein each pair of box channel supports includes a first support and a second support, wherein a distance between said first support and said second support is greater than the width of said outer casing of the heat exchanger, and wherein a height of said box channel supports is at least double the height of said outer casing; and
  wherein said length of said heat exchanger is arranged in a coil and each pair of box channel supports holds at least two non-continuous portions of the length of the heat exchanger.
12. The system of clause 11, further comprising:
  a third fluid tube including a length and a flow of second heat transfer fluid into and through said third fluid tube, wherein the second heat transfer fluid entering the third fluid tube has a different temperature than the wastewater entering the first fluid tube.
13. The system of any one of clauses 11-12, further comprising:
  a second box channel base positioned perpendicularly with respect to the first box channel base, wherein said second box channel base includes a pair of box channel supports extending vertically from each end of the second box channel base; and
  wherein each of the box channel supports of the second box channel base holds at least two non-continuous portions of the length of the heat exchanger.
14. The system of clause 13, wherein said first box channel base and said second box channel base have the same length so that the heat exchanger is coiled in a circular shape when supported by said first box channel base and said second box channel base.
15. A method of treating wastewater, comprising:
  conditioning sewage in the wastewater into a slurry;
  pumping the slurry through a first fluid tube;
  pumping a heat transfer fluid through a second fluid tube;
  wherein the first fluid tube is adjacent to the second fluid tube within a first casing so that the wastewater and the heat transfer fluid are separated by walls of the first fluid tube and the second fluid tube that is adjacent the first fluid tube;
  wherein said first casing is positioned within a second casing and insulation having an RSI of at least 0.8 $m^2 \cdot K/W$ is present between said first casing and said second casing;
  wherein said heat transfer fluid is pumped through said second fluid tube in a direction that is opposite to the direction in which the slurry is pumped through said first fluid tube;
  wherein when the slurry is at a lower temperature than the heat transfer fluid, heat is transferred from the heat transfer fluid to the slurry; and
  wherein when the slurry is at a higher temperature than the heat transfer fluid, heat is transferred from the slurry to the heat transfer fluid.
16. The method of treating wastewater of clause 15, wherein when the slurry is at a lower temperature than the heat transfer fluid, the heat transferred from the heat transfer fluid to the slurry is sufficient to raise the temperature of the slurry to 75° F.
17. The method of treating wastewater of clause 16, wherein the temperature of the heat transfer fluid is 90° F.-130° F.
18. The method of treating wastewater of any one of clauses 15-17, wherein a heat source for the heat transfer fluid is a solar thermal panel.
19. The method of treating wastewater of any one of clauses 15-18, further comprising:
  a third fluid tube;
  wherein said third fluid tube is positioned within said first casing and adjacent to said first fluid tube to allow heat transfer between the wastewater and a fluid within said third fluid tube; and
  wherein heat transfer fluid in said third fluid tube is pumped through said third fluid tube in a direction that is opposite to the direction in which the slurry is pumped through said first fluid tube.

The invention claimed is:
1. A method comprising:
  flowing wastewater into and through a first fluid tube;
  flowing a heat transfer fluid into and through a second fluid tube; wherein the heat transfer fluid entering the second fluid tube has a different temperature than the wastewater entering the first fluid tube;
  wherein said first fluid tube and said second fluid tube are positioned within a first casing;
  wherein said first casing is surrounded by insulation having an RSI of at least 0.8 $m^2 \cdot K/W$;
  wherein said first casing and said insulation are positioned within a second casing; and
  wherein each material separating said wastewater in said first fluid tube and said heat transfer fluid in said second fluid tube has an RSI of less than 0.6 $m^2 \cdot K/W$ to allow heat transfer between the wastewater in said first fluid tube and the heat transfer fluid in said second fluid tube.
2. The method of claim 1, wherein the first fluid tube is adjacent to the second fluid tube within the first casing so that the wastewater and the heat transfer fluid are separated by walls of the first fluid tube and the second fluid tube.
3. The method of claim 1, further comprising:
  a third fluid tube positioned within said first casing; and
  wherein the said wastewater in said first fluid tube and a fluid within said third fluid tube are separated by material having an RSI value ($m^2 \cdot K/W$) of less than 0.6 to allow heat transfer between the wastewater and the fluid within said third fluid tube.
4. The method of claim 1, wherein a heat transfer enhancement grout is positioned within said first casing and around at least a portion of said second fluid tube.
5. The method of claim 1, wherein said insulation is a closed cell type insulation.
6. The method of claim 1, wherein the wastewater within said first fluid tube flows in an opposite direction of the heat transfer fluid within said second fluid tube.
7. The method of claim 1, wherein said wastewater is at least one of sewage, surface storm water, lake water, river water, or brackish water.
8. The method of claim 1, wherein said heat transfer fluid entering said second fluid tube is at a higher temperature than said wastewater entering said first fluid tube, and wherein heat from said heat transfer fluid in said second fluid tube is transferred to said wastewater to heat the wastewater to a degree sufficient to activate microbes in the wastewater and increase treatment capacity.
9. The method of claim 1, wherein said heat transfer fluid entering said second fluid tube is at a lower temperature than said wastewater entering said first fluid tube, and wherein heat from the wastewater is transferred to the heat transfer fluid to a degree sufficient to prohibit microbes in the wastewater from becoming anaerobic.

10. The method of claim 9, wherein said heat transfer fluid communicates with a heating, ventilation, and air conditioning (HVAC) system of a building.

11. A method of treating wastewater, comprising:
conditioning sewage in the wastewater into a slurry;
pumping the slurry through a first fluid tube;
pumping a heat transfer fluid through a second fluid tube;
wherein the first fluid tube is adjacent to the second fluid tube within a first casing so that the wastewater and the heat transfer fluid are separated by walls of the first fluid tube and the second fluid tube that is adjacent the first fluid tube;
wherein said first casing is positioned within a second casing and insulation having an RSI of at least 0.8 m²·K/W is present between said first casing and said second casing;
wherein said heat transfer fluid is pumped through said second fluid tube in a direction that is opposite to the direction in which the slurry is pumped through said first fluid tube;
wherein when the slurry is at a lower temperature than the heat transfer fluid, heat is transferred from the heat transfer fluid to the slurry; and
wherein when the slurry is at a higher temperature than the heat transfer fluid, heat is transferred from the slurry to the heat transfer fluid.

12. The method of treating wastewater of claim 11, wherein when the slurry is at a lower temperature than the heat transfer fluid, the heat transferred from the heat transfer fluid to the slurry is sufficient to raise the temperature of the slurry to 75° F.

13. The method of treating wastewater of claim 12, wherein the temperature of the heat transfer fluid is 90° F.-130° F.

14. The method of treating wastewater of claim 11, wherein a heat source for the heat transfer fluid is a solar thermal panel.

15. The method of treating wastewater of claim 11, further comprising:
a third fluid tube;
wherein said third fluid tube is positioned within said first casing and adjacent to said first fluid tube to allow heat transfer between the slurry and a heat transfer fluid within said third fluid tube; and
wherein said heat transfer fluid in said third fluid tube is pumped through said third fluid tube in a direction that is opposite to the direction in which the slurry is pumped through said first fluid tube.

* * * * *